April 30, 1929.  H. G. KAMRATH  1,710,988
INDICATOR
Filed July 17, 1922  4 Sheets-Sheet 3

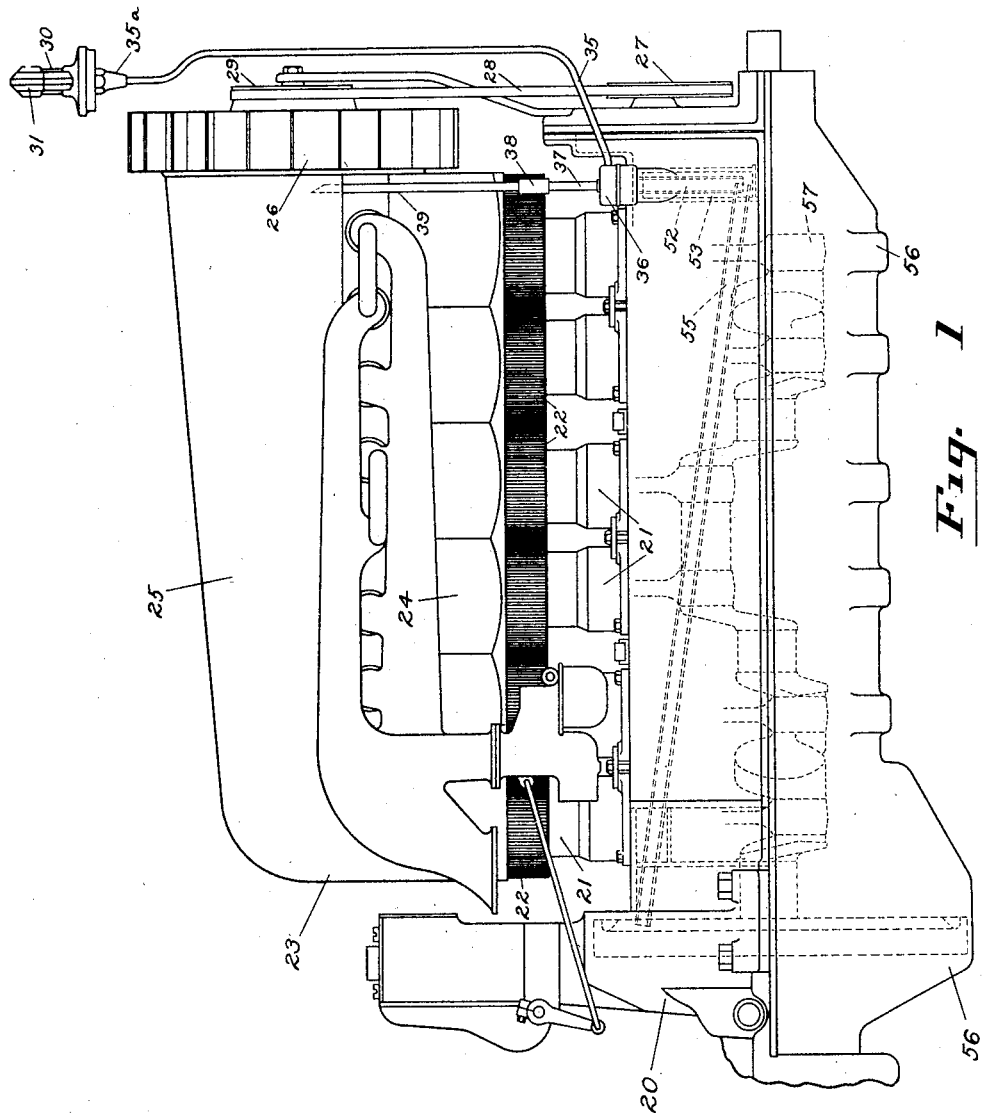

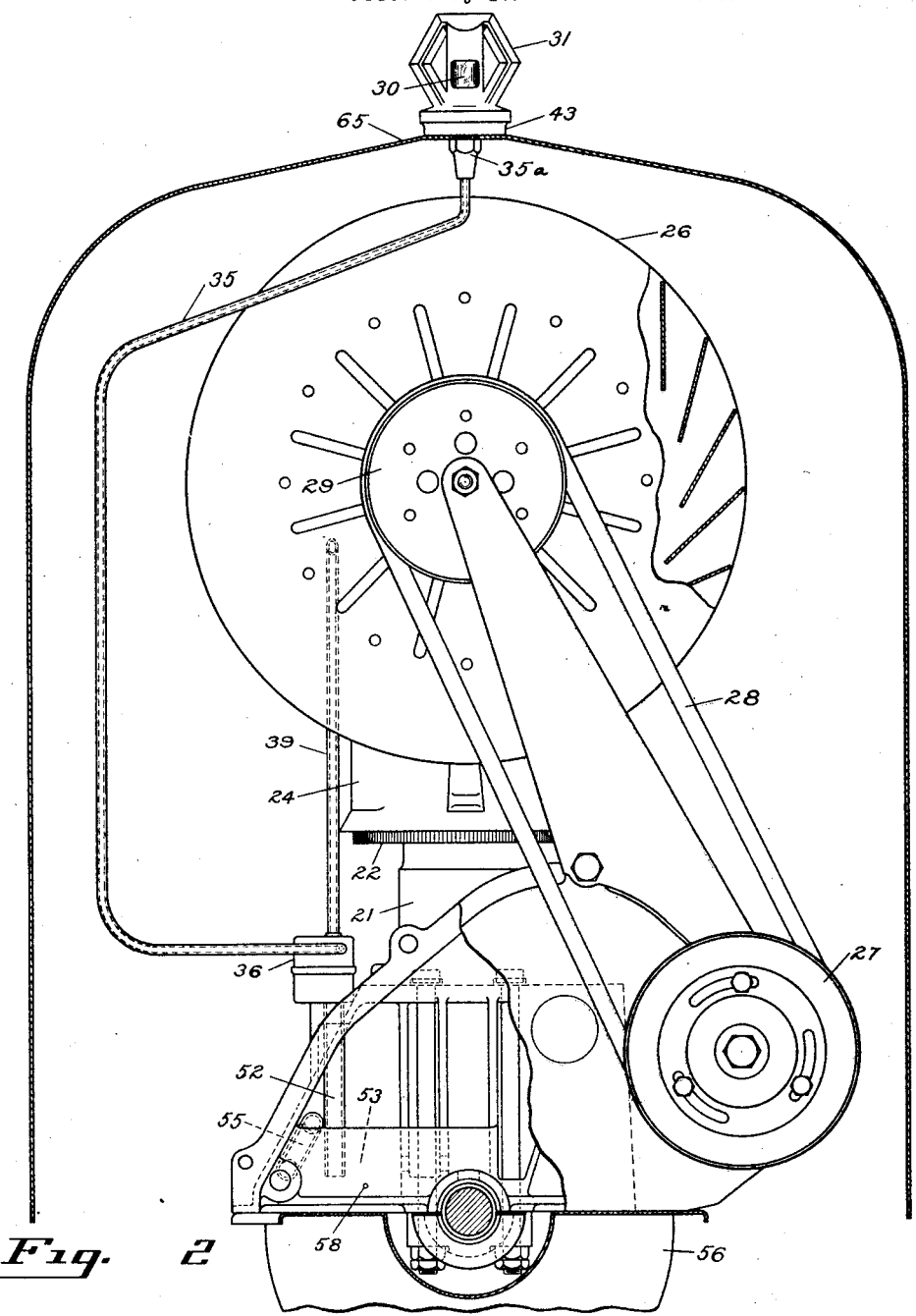

Witnesses
Wm. P. Pasco
Geo. E. Pasco

Inventor
Herbert G. Kamrath
Francis D. Hardesty
By
Attorney

April 30, 1929.    H. G. KAMRATH    1,710,988
INDICATOR
Filed July 17, 1922    4 Sheets-Sheet 4
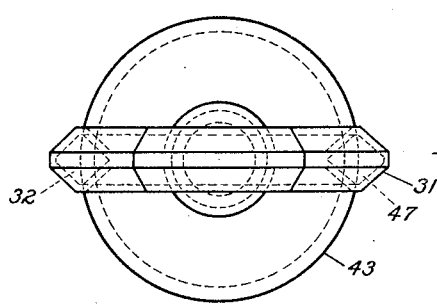
Fig. 8
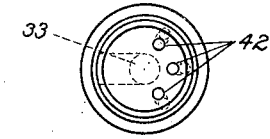
Fig. 10
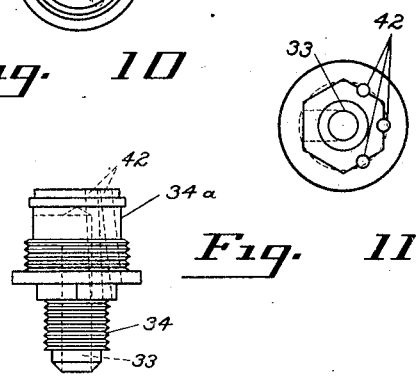
Fig. 11
Fig. 9
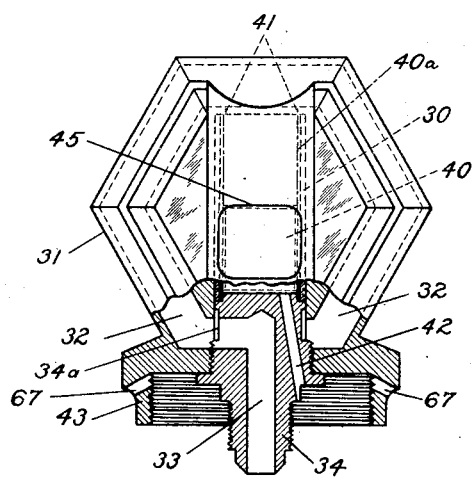
Fig. 6
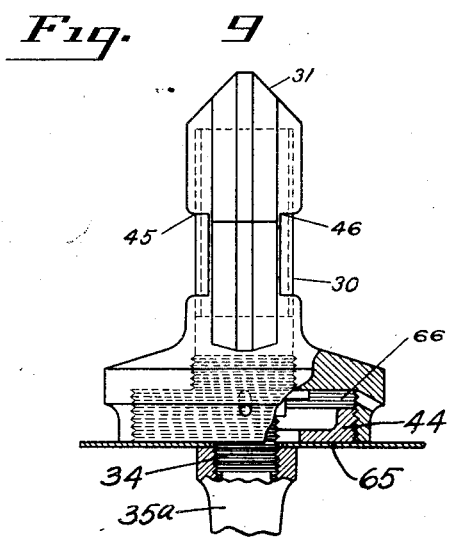
Fig. 7
Witnesses
Wm. P. Pasco
Geo. E. Pasco
Inventor
Herbert G. Kamrath
By Francis D. Hardesty
Attorney Patented Apr. 30, 1929.

1,710,988

UNITED STATES PATENT OFFICE.

HERBERT G. KAMRATH, OF DAYTON, OHIO, ASSIGNOR TO GENERAL MOTORS RESEARCH CORPORATION, OF DAYTON, OHIO, A CORPORATION OF DELAWARE.

INDICATOR.

Application filed July 17, 1922. Serial No. 575,724.

This invention relates to an indicating device especially useful in connection with an air cooled internal combustion engine, and especially for use on an automotive vehicle.

In the copending application of Caleb E. Summers, Serial No. 554,344, filed April 17, 1922, is disclosed a device which indicates visibly the cessation of flow of air in the air cooling system of an internal combustion engine, and the same indicating device indicates the cessation of the flow of lubricant in the lubricating system of the engine.

In said copending application the indicator includes a duct in communication with the draft tube of the engine. This duct includes a restriction against which an indicating device such as a light weight ball is drawn against gravity by suction in the duct which results from the flow of air in the air cooling system. This indicating ball is inclosed within a transparent portion of the duct, and when the ball is released owing to the cessation of air flow, the ball will fall into a portion of the duct which is visible to the driver of the automobile. This duct is open to atmosphere normally, so that there will be a difference in pressure between the pressures on the lower and upper sides of the ball when the air cooling system is functioning properly. If for any reason this communication with atmosphere be closed off, then the ball will drop down into indicating position although the circulating air may be flowing. In this copending application the closing of the communication with atmosphere is accomplished by mechanism which is responsive to the failure of the lubricating system of the engine.

In the present invention it is among the objects to provide an improved indicating device which shall be responsive to either the cessation of flow of cooling air or the cessation of the flow of engine lubricant, or both, and which is exceedingly simple in construction and can be manufactured at a very low cost. In carrying out the present invention there is provided a duct in communication with the air cooling system of the engine, and said duct is in communication with the atmosphere and includes a restriction which is closed by an indicating element when the suction in the duct is sufficient. Instead of closing the communication to atmosphere as disclosed in the application referred to, the suction side of the duct includes a branch portion which extends into a well of engine lubricant which forms a part of the lubricating system. As long as any lubricant flows in this system in sufficient quantities for the operation of the engine this branch portion will be sealed off from atmosphere by lubricant in the well.

A further object of the present invention is to provide an indicator adapted to be mounted preferably upon the hood of the automobile and to have provisions whereby the indicating element will be visible to the driver both day and night in case said element is in its indicating position.

Other and further objects and advantages of the present invention will be apparent from the following description of a preferred embodiment thereof, reference being made to the accompanying drawings.

Fig. 1 is a side elevation of an air cooled engine to which the present invention is applied.

Fig. 2 is a front elevation partly in section of the engine, and on a scale larger than Fig. 1.

Fig. 6 is a front elevation partly in section of the indicator.

Fig. 7 is an end view thereof.

Fig. 8 is a top view thereof.

Fig. 9 is a side view of a coupling for the indicator.

Fig. 10 is a top view thereof.

Fig. 11 is a bottom view thereof.

Figure 4:
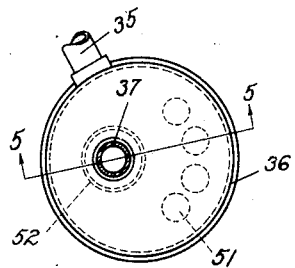
Fig. 4 is a sectional view of a portion of the suction duct shown in Fig. 3, the section being taken on the line 4—4 of Fig. 3.

In the drawings, 20 designates an internal combustion engine provided with an air cooling system, which is chosen for the purpose of illustrating the use of the present invention. This particular engine is described and claimed in the copending application of Charles F. Kettering and Charles R. Short, Serial No. 553,938, filed April 17, 1922, but it is understood that this invention is not limited in its application to any particular air cooled engine.

This engine 20 includes a plurality of cylinders 21 each having fins 22. The air circulating system includes a draft tube 23 having a skirt portion 24 which encloses the cylinder fins so as to provide for the circulation of air along the fins and preferably from the bottom of the cylinder to the top.

The skirt portion 24 merges into the main draft tube portion 25 which is closed at the rear end and open at the front end so as to be in communication with a fan 26 which is driven by the engine through pulley 27, belt 28, and pulley 29. It is intended that the fan shall be revolved while the engine is running in order that heat may be carried away from the engine cylinders in sufficient quantities to insure the proper operation of the engine and to prevent any damage which might result from overheating. It is therefore desirable that there shall be an indication of the failure of the fan to operate whether this failure will occur in the day time or night time it is desirable that the indicating means be made exceedingly simple so as to minimize the liability of the indicating device being inoperative.

As explained before, the indicating device comprises a suction duct having a restriction which acts as a valve seat to receive the indicating element which acts as a valve. The suction duct includes the transparent tube 30 which is supported by the fixture 31, the passage 32 which is provided by the fixture 31, the passage 33 which is provided by the coupling 34, the tube 35, box 36, tube 37, coupling 38, and tube 39 which extends into the main portion 25 of the draft tube 23. The upper end of this tube 39 is located adjacent the outlet of the draft tube and the inlet to the fan 26, and is beveled as shown at 39$^a$ in Fig. 3, so that even while the fan is operating at low speeds the suction produced by the circulation of air will be sufficient to cause the indicating element 40, see Fig. 6, to be sucked upwardly in the tube 30 into the position 40$^a$ indicated by dot and dash line. In this position the element 40 is located against the restriction 41 which acts as a valve seat to receive the element 40 which acts as a valve for closing off the suction duct from the atmosphere so that the pressure on the upper side of the element 40 will be less than on the lower side. The element 40 is preferably a light weight hollow cylinder, slidable within the tube 30 and adapted to close the restriction 41. The coupling 34 is provided with a circumferentially arranged channel 34$^a$ which is adapted to communicate with certain channels in the fixture 31 as will be described hereinafter. Another passage 42 is also provided in the coupling 34 which connects the interior of the tube 30 with the space 66 formed inside the fixture cap 43 above the front portion 65 of the engine hood. This space 66 communicates with atmosphere by means of the channels 67 provided in the fixture cap 43, thus the space within the tube 30 is open to atmosphere.

As has been mentioned before, the fixture 31 is provided with a cap portion 43 which is internally threaded whereby the fixture is adapted to be attached to the externally threaded flange 44 carried by the front portion 65 of the engine hood. The fixture 31 provides a housing for the transparent tube 30 which is held in position within said housing by means of the coupling 34 (see Fig. 6). This tube housing is provided with oppositely disposed openings or windows 45 and 46 so as to render visible to the operator only that portion of the transparent tube 30 adjacent to which the indicating element 40 is located when in position to indicate the inoperativeness of the air-cooling system or cessation of lubricant flow. The element 40 is preferably constructed of a semitransparent substance such as thin celluloid, and is preferably red or some other distinctive color. When in the indicating position the cylinder 40 acts like a red curtain dropped down over the windows 45 and 46. The clear spot in the center of the fixture 31 appears red and is of sufficient size to be readily visible in the day time. If, in the night time when of course head lights are turned on to the road ahead of the vehicle, the element 40 is in indicating position, this red spot will be clearly visible to the driver upon looking through the element 40 toward the illuminated road ahead.

Referring again to Fig. 6, it will be noticed that the passage 32 leads into the tube 30 through a restriction 41. Each end of the channel 32 communicates with the circumferential channel 34$^a$ on the coupling 34 when said coupling is screwed in position in the fixture 31 as shown in Fig. 6.

When the fixture is placed in position on the engine hood cover the cap is first screwed down upon the exterior threaded flange 44 thus causing the threaded end of the coupling 34 to project through an opening in the engine hood cover 65. The clamping nut 35$^a$ which connects with the tube 35 is then screwed into position, said nut 34 having an enlarged head which when the nut is in position will shut off the opening in the engine hood cover 65 through which the coupling 34 projects, thus shutting off the space 66 in the fixture cap 43 from the heat of the engine. This will permit only cool air from the atmosphere to pass through the channels 67 in the cap 43 into the space 66 and thence into the interior of the tube 30 by means of the channel 42. This will tend to eliminate fogging the transparent tube 35 which would happen if warm air from the engine were permitted to pass into said tube and cooler atmospheric air to strike the outside of said tube.

As is apparent from Figs. 2 and 6, aside from performing a very important function as an indicating device, this indicating fixture promotes a very neat and attractive appearance, thus also serving as an ornament to the front end of the engine hood.

Figure 5:
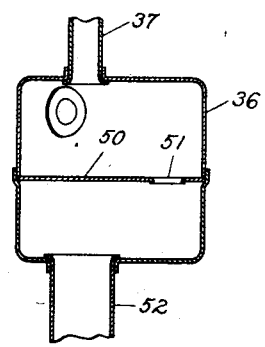
Fig. 5 is a sectional view taken on the line 5—5 of Fig. 4.
Figure 3:
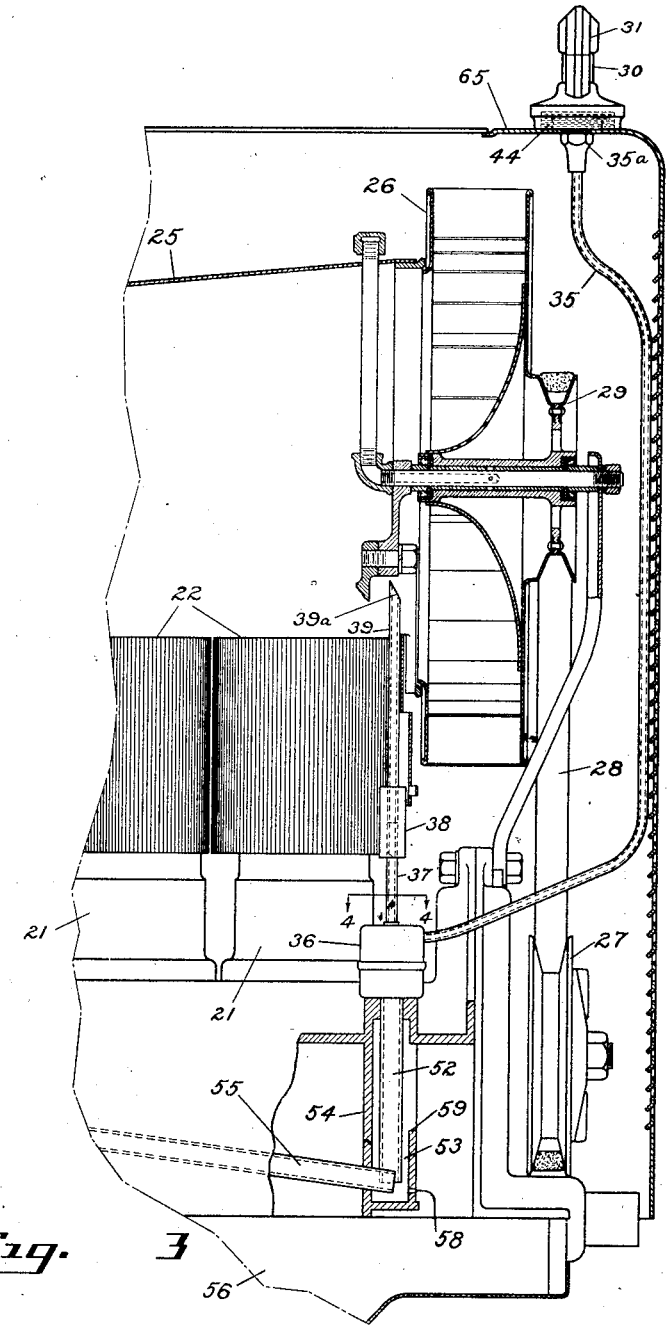
Fig. 3 is a fragmentary side elevation of the engine shown in Fig. 1, certain parts being shown in section.

Referring to Figs. 3, 4 and 5, the box 36 includes a partition 50 having a plurality of holes 51, and the bottom of the box is connected by a pipe 52 with a lubricant well 53 which is formed preferably integrally with the crank case 54 of the engine 20. In the copending application of Kettering and Short referred to, the lubricating system includes a duct 55 from which oil is supplied to various crank shaft bearings of the engine, the pipe 55 receiving its supply of oil during the operation of the engine from an oil sump 56. The pipe 55 and the oil pumping apparatus are constructed so that the pipe 55 receives more oil than is supplied to the main engine bearing, and the surplus oil in pipe 55 simply flows out through the end thereof and down into the oil trough 56 from which oil is splashed by the engine connecting rods 57. In the present invention the surplus oil from the pipe 55 flows first into the well 53, and this well is provided with a small outlet 58. During the normal operation of the engine the excess from the pipe 55 simply fills up the well 53 so that it flows over the edge 59. In case the engine stops, then the well 53 will be drained through the small hole 58. Therefore in starting the engine again the indicator 40 will not be lifted immediately from its indicating position, but the engine will turn over a few times until sufficient oil has been delivered through the pipe 55 to fill up the well 53. This operation indicates to the driver that in starting out on a trip there is sufficient supply of lubricant for the engine.

Should the supply of lubricant give out or the lubricant circulating apparatus fail to operate, then the well 53 will become empty and the lower end of the pipe 52 will be unsealed, thus permitting air from the external atmosphere to enter the lower end of the pipe 52. This will break the suction in the pipe or duct 35 and prevent the indicating element 40 from being drawn upward against the valve seat 41. Since atmospheric pressure will exist on both the upper and lower sides on the indicating element 40 this element will drop from its position 40ª occupied during the normal operation of the engine down into the indicating position opposite the windows 45 and 46.

The partition 50 serves as a baffle within the box 36 so that due to a sudden increase in suction the oil from the well 53 may surge up the pipe 52 and splash against the partition 50 and be diverted downwardly again. If this partition were not present some oil might be sucked up through the pipes 37 and 39 due to a sudden surge of lubricating oil up through the pipe 52. For this reason the holes 51 establishing communication between the pipes 37 and 52 are placed out of alignment with these pipes.

It is apparent from the foregoing that there has been provided an exceedingly simple and reliable indicating device for producing a visible signal designating the cessation of either the flow of circulating air or the flow of engine lubricant or both. The mechanism is simply a suction duct in communication with the air system, a valve seat or restriction in the duct and an indicating element or valve which closes the restriction when the suction in the duct is normal. By normal is meant an amount which is produced by the air circulating system during the normal operation of the engine at low driving speed or in excess. The use of the indicator to show the lack of engine lubricant is brought about simply by unsealing the end of a branch pipe from the suction duct. The indicating fixture is adapted to be mounted on the engine hood to serve also as an ornament for the hood, and to be in such a position that the indication will be visible in the day time by reflected light, and at night, by looking through transparent portions of the indicator toward the illuminated road ahead of the vehicle.

While the form of mechanism herein shown and described constitutes a preferred form of embodiment of the present invention, it is to be understood that other forms might be adopted all coming within the scope of the claims which follow.

What I claim is as follows:

1. In an indicating system for automotive vehicles, and in combination with a multiple cylinder air cooled internal combustion engine, and means for causing air to flow past the cylinders thereof to cool the same; an indicator; and means dependent upon the flow of air aforesaid for actuating the same; said indicator being mounted on the vehicle substantially in line with the vision of the driver when observing the road ahead and serving to indicate inoperativeness of the cooling system.

2. In an indicating system for automotive vehicles, and in combination with a multiple cylinder air cooled internal combustion engine, and means for causing air to flow past the cylinders thereof to cool the same; an indicator; and means dependent upon the flow of air aforesaid for actuating the same; said indicator including a transparent portion substantially in line with the vision of the driver when observing the road ahead; and an indicating element movable to intercept vision through said transparent portion, to thereby indicate inoperativeness of the cooling system.

3. In an indicating system for automotive vehicles, and in combination with a multiple cylinder air cooled internal combustion engine, and means for causing air to flow past the cylinders thereof to cool the same; an indicator; and means dependent upon the flow of air aforesaid, and dependent also upon the action of the lubricating system of the engine, for actuating said indicator; said indicator being mounted on the vehicle and having an indicating element visible to the driver when observing the road ahead to thereby indicate inoperativeness either of the cooling system or of the lubricating system of the engine.

4. In an indicating system for automotive vehicles, and in combination with a multiple cylinder air cooled internal combustion engine, and means for causing air to flow past the cylinders thereof to cool the same; an indicator; and means dependent upon the flow of air aforesaid, and dependent also upon the operation of the lubricating system, for actuating the said indicator; said indicator including a transparent portion substantially in line with the vision of the driver when observing the road ahead, and an indicating element movable to intercept vision through said transparent portion to thereby indicate inoperativeness of either the cooling system or the lubricating system of the engine.

5. In an indicating system, the combination with an engine having an air cooling system; of a duct connected with said system; means for indicating the tendency of air to flow in said duct; and means the function of which is dependent upon lack of engine lubricant for preventing the operation of said indicating means.

6. In an indicating system, the combination with an engine having an air cooling system; of an air suction duct connected with said system; means for indicating suction in said duct; and means the operation of which is dependent upon cessation of flow of engine lubricant for arresting the operation of said suction indicating means.

7. In an indicating system, the combination with an engine having an air cooling system and a lubricating system; of a suction duct connected with said air system and with said lubricating system, means for indicating suction in said duct, and means responsive to cessation of lubricant flow for relieving suction in said duct.

8. In an indicating system, the combination with an engine having an air cooling system and a lubricating system; of a suction duct connected with said systems; means responsive to suction tending to close said duct from atmosphere and movable to indicate the absence of suction in said duct; and means responsive to cessation of lubricant flow for relieving suction in said duct.

9. In an indicating system, the combination with an engine having an air cooling system and a lubricating system; of a suction duct connected with said systems, indicating means connected with said duct including a valve tending to close said duct from atmosphere, said valve serving as a visible indicator in case of absence of suction in said duct; and means responsive to cessation of lubricant flow for relieving suction in said duct.

10. In an indicating system, the combination with an engine having an air cooling system and a lubricating system; of a suction duct connected with said air cooling system; indicating means connected with said duct including a valve tending to close said duct from atmosphere, said valve serving as a visible indicator in case of absence of suction in said duct; and a branch duct connected with said first mentioned duct between the indicator and the cooling system, said branch duct being closed to atmosphere by the presence of sufficient engine lubricant.

11. In an indicating system, the combination with an engine having an air cooling system; of a suction duct connected with said air cooling system; means for indicating suction in said duct; and a branch duct connected with said first mentioned duct between the indicator and the cooling system, said branch duct being closed to atmosphere by the presence of sufficient engine lubricant.

12. In combination an air circulating system, a fixture having a passage through which fluid circulation is induced when the passage is connected with the air circulating system, said passage including a transparent portion through which an illumination beyond the indicator is visible; and an indicating element, normally hidden when said system is operating properly, but movable into said transparent portion to intercept vision therethrough in case of inoperativeness of the circulating system.

13. In an indicating system for an engine having a plurality of circulatory systems, the combination with an indicating fixture and means for connecting said fixture with said systems, said fixture having a transparent portion through which an illumination beyond the indicator is visible; and an indicating element movable into said transparent portion to intercept vision therethrough in case of inoperativeness of either of said circulatory systems.

In testimony whereof I hereto affix my signature.

HERBERT G. KAMRATH.